United States Patent [19]

Chen et al.

[11] Patent Number: 4,931,933
[45] Date of Patent: Jun. 5, 1990

[54] APPLICATION OF KNOWLEDGE-BASED SYSTEM FOR GRADING MEAT

[75] Inventors: Yud-Ren Chen, Hastings; Steven A. Robinson, Oak, both of Nebr.

[73] Assignee: The United States of America as represented by the Secretary of Agriculture, Washington, D.C.

[21] Appl. No.: 308,220

[22] Filed: Feb. 9, 1989

[51] Int. Cl.$^5$ .............................................. G06F 15/21
[52] U.S. Cl. ...................................... 364/409; 364/513
[58] Field of Search ........ 364/409, 513, 200 MS File, 364/552

[56] References Cited

U.S. PATENT DOCUMENTS

| 4,760,444 | 7/1988 | Nielson et al. | 358/101 |
| 4,785,817 | 11/1988 | Stouffer | 128/660.07 |
| 4,805,679 | 2/1989 | Czinner | 144/357 |

OTHER PUBLICATIONS

Barr et al., *The Handbook of Artifical Intelligence*, vol. I, Addison-Wesley Pub. Co., p. 325, 1986.
Waterman, *A Guide to Expert Systems*, Addison-Wesley Pub. Co., pp. 66–67, 127–134 and 239–243, 1986.
"Weighing and Grading in the Meat Industry", *Autom. and Control*, vol. 6, No. 2, 1976, pp. 37–38.
"Computer-Based Meat Grading System Under Development", *Foodstuffs*, vol. 60, No. 15, p. 11.
"Computerized Beef Grading Could Save Time", USDA Agricultural Research Service, *Animal Production and Protection*, Feb. 1989, p. 1.

Primary Examiner—Jerry Smith
Assistant Examiner—David M. Huntley
Attorney, Agent, or Firm—M. Howard Silverstein; John D. Fado; Curtis P. Ribando

[57] ABSTRACT

An applications system has been developed to assist meat graders in deciding the yield and quality grades of carcasses. The applications system comprises: (1) an input for information relating to characteristics of a carcass to be graded; (2) a program comprising a knowledge base of facts and rules relating to grading of the carcasses; (3) an inference engine for processing the input information against the facts and rules of the knowledge base to arrive at yield and quality grades for the carcass; and (4) an output for the carcass grades. An embodiment useful for the grading of beef carcasses has been illustrated.

9 Claims, 1 Drawing Sheet

APPLICATION OF KNOWLEDGE-BASED SYSTEM FOR GRADING MEAT

BACKGROUND OF THE INVENTION

1. Field of the Invention

Assessing meat yield and quality in livestock carcasses is important for exporting meat and for the domestic consumer. It is important at all stages of the meat marketing chain from farm to retail sale. Since the meat grading system was first put into use in the United States in 1927, meat has been graded by human graders. The method used to grade meat is very subjective and, because of this subjective nature, it is very difficult (if not impossible) to achieve consistency and equity. The development of instruments to assist the human grader in evaluating grade factors has been attempted without much success.

This invention relates to a knowledge-based system for grading carcass meat.

2. Description of the Prior Art

In carcass beef grading, the carcasses are graded according to their degree or relative development of the desirable physical characteristics. The grade of the carcass is to reflect the differences in the portion of the desirable to less desirable parts of the carcass or cut, to reflect the ratio of meat to bone, and also to evaluate the characteristics of the meat which are associated with its ultimate palatability. The USDA beef grading standards are designed to measure the quality (palatability) and the yield (cuttability) of the product as presented in carcass form. The quality grades are Prime, Choice, Select (formerly Good), Standard, Commercial, Utility, Cutter, and Canner, in order of decreasing palatability. The yield grades are Grades 1 through 5, with Grade 1 having the highest yield of retail cut and Grade 5 the lowest yield of retail cut.

In present practice, meat graders reason about the final yield and quality grade of the carcasses using judgmental rules and empirical associations along with visual observation of the conditions of the carcasses. There are usually no algorithmic solutions except a formula for computing the preliminary yield grade of the carcass as given in the *Meat Evaluation Handbook* (National Live Stock and Meat Board, 1983). Since the grading of meat is accomplished by qualitative reasoning techniques rather than by mathematical or data processing procedures, this task represents an ideal application of a knowledge-based expert system.

Current developments in artificial intelligence programming, particularly in the expert systems field, make it possible to devise computer programs to assist humans in rendering decisions to complex judgemental type problems. As the name suggests, an expert system solves complex reasoning tasks that normally require an expert. A computer program in an artificial intelligence programming language deals with symbolic, nonalgorithmic methods of problem solving. These problem solving techniques relate symbols or objects through judgmental rules, or heuristics, as well as through theoretical laws and definitions. Expert systems programming uses artificial intelligence programming methods to solve problems conventional programming techniques cannot tackle.

A rule-based expert system, which is sometimes called an IF-THEN or situation-action system, consists of a knowledge-base and an inference engine. The knowledge-base contains information, consisting of facts and rules, about the specific area of interest and activity that the expert system deals with. Rules describe the logical relationships among elements of information within this area. The inference engine is the program that processes the rules and information and makes the inferences to arrive at specific conclusions.

SUMMARY OF THE INVENTION

Using advanced computer technology, we have now developed an applications system to assist meat graders in deciding the yield and quality grades of carcasses. The applications system comprises: (1) means for inputting information relating to characteristics of a carcass to be graded; (2) a program comprising a knowledge base of facts and rules relating to grading of the carcasses; (3) an inference engine for processing the input information against the facts and rules of the knowledge-base to arrive at yield and quality grades for the carcass; and (4) a means for outputting the carcass grades.

In accordance with this discovery, it is an object of the invention to provide an applications system for assisting meat graders in deciding the yield and quality grades of meat carcasses.

Another object of the invention is to provide a system for objectively and reliably determining the yield and quality of meat on a carcass based upon input information relating to carcass characteristics.

It is also an object of the invention to relieve human carcass graders of mental fatigue associated with assigning grades to carcasses over a prolonged period of time.

A further object of the invention is to employ a computerized grading system which is amenable to rapid information input and processing.

Another object of the invention is to provide a system for training inexperienced human meat graders, and for verification or testing of experienced human meat graders.

Other objects and advantages of the invention will be readily apparent from the ensuing description.

DETAILED DESCRIPTION OF THE INVENTION

Figure 1:
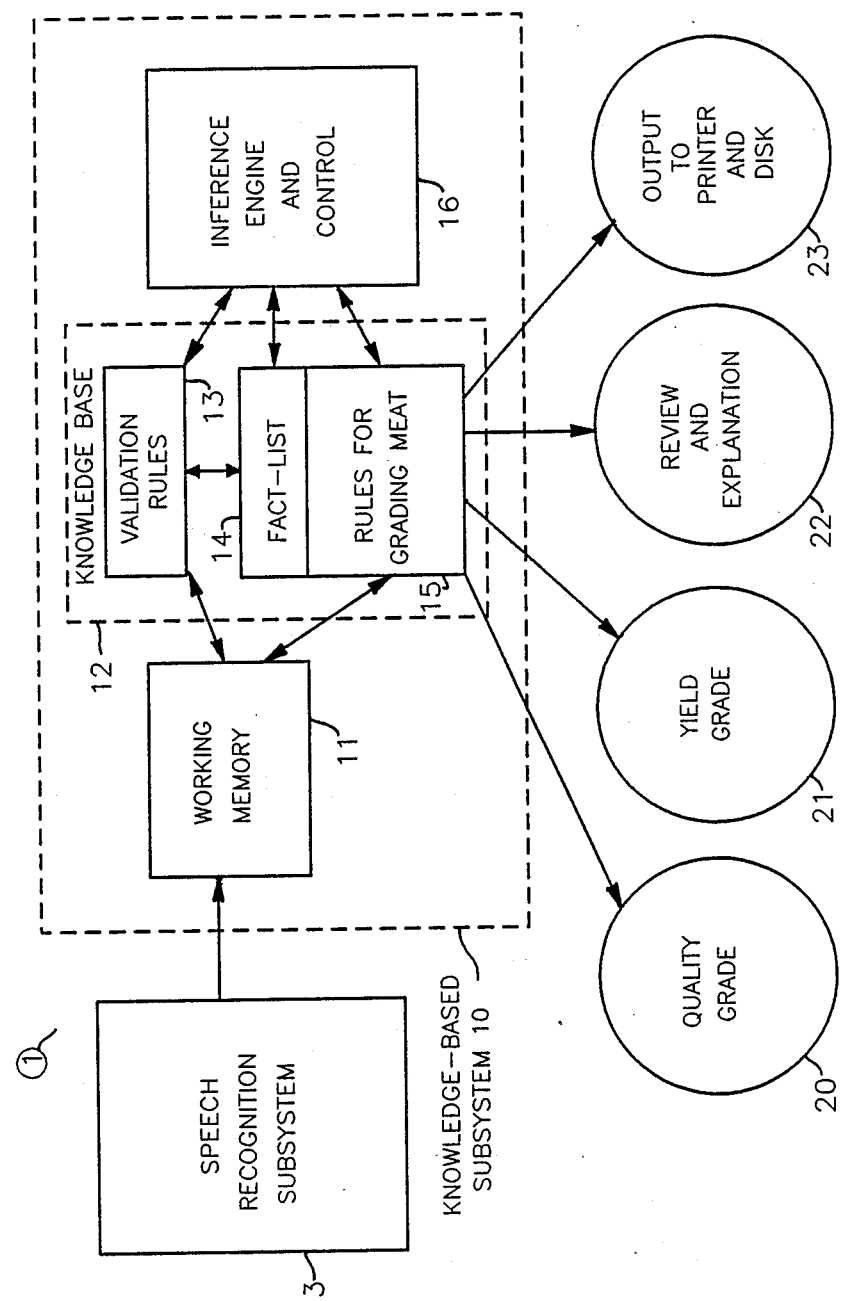
FIG. 1 is a block diagram of a preferred embodiment of the applications system of the invention.

The expression "applications system" is used herein in reference to the total carcass grading system of the invention. The expression "knowledge-based subsystem" refers to a component of the applications system. This subsystem is a rule-based program comprising a knowledge base of the facts and rules needed to generate both yield and quality grades based upon the input information relating to carcass characteristics and the inference engine for processing the input information in relation to the knowledge base. The term "fact-list" is descriptive of that portion of the knowledge base allocated to storing the facts about carcass meat and the grading of carcass meat. The expression "production rule" is used to describe any program statement or sequence of program statements using an "IF, THEN" syllogism.

In a preferred embodiment of the invention illustrated in FIG. 1, the application system 1 comprises a knowledge-based subsystem 10 of the type described above together with a voice recognition subsystem 3.

The voice recognition subsystem 3 is employed for the purpose of inputting information into the knowledge-based system 10. The voice recognition system may be any device as known in the art which is capable of digitizing the human voice and emulating the keyboard input. In most commercially-available systems, the voice input is accomplished by means of a microphone or similar device for converting the voice into an analog electrical signal. The signal is thereafter subjected to accoustic processing, to include signal conditioning and analog-to-digital conversion. The resultant digital signal is passed through decoder processing whereby input sounds or sound combinations become associated with an output string. Most of the currently available voice recognition systems must be "trained" to recognize the user's voice by construction of a library or vocabulary file of each word or phrase to be used in the task. Voice patterns of these training words are preferably stored in the system's memory and saved on disk for repeated use. The words and phrases in the vocabulary file are selected to match those defining the parameters used in the production rules preprogrammed into the knowledge-based subsystem described below. For the grading of beef, for example, descriptive words are taken from the *Official United States Standards for Grades of Carcass Beef* (USDA-FSQS, 1980).

It is advantageous to divide the vocabulary into logical groups or menus of related characteristics. One reason is that the speed of the matching process is increased if only part of the total vocabulary is active and there are fewer words for comparison with the input patterns. Secondly, similar sounding words that are unrelated can be put into different groups, reducing the risk of an incorrect path. Words and phrases that are frequently used may be kept active at all times; otherwise, they are kept in a submenu and are activated only when necessary.

Upon comparison of the digitized voice input with the vocabulary file, recognized output strings are converted to simulated keystrokes by a keyboard emulator or the like. These simulated keystrokes are analogous to input made by keyboard entry and are processed in the knowledge-based system. The input information includes carcass characteristics and measurements as observed by the grader. These data are used by the knowledge-based system to determine both the quality and the yield grades.

The knowledge-based system (subsystem) 10 depicted in FIG. 1 comprises as its essential components a working memory 11 (short-term memory); the knowledge base 12 (long-term memory) comprising a set of validation rules 13, fact-list 14, and a set of rules for grading meat 15; and an inference engine and control strategy 16. The validation rules are production rules for checking the accuracy of input data against facts in the fact-list. The rules for grading meat are production rules used to generate the quality grade 20, the yield grade 21, an optional review and explanation of the grade determination 22, and permanent output records of the grade determinations to printer and disk, 23. The role of each of these components will become apparent in the ensuing Example. The reasoning process employed by the system is of course a function of the particular program. Some programs employ a forward-chaining process, others backward-chaining, and others a combination of the two. After grading is complete, the results are output to a screen, printer, hard disk, or other suitable device.

The Example, below, describes an implementation of the invention for the grading of beef carcasses using a knowledge-based system developed in the 'C' Language Integrated Production System (CLIPS) environment.

EXAMPLE

A system for grading carcass beef was developed by integrating a voice input subsystem with a knowledge-based subsystem. Both subsystems were installed in, and operated by, a "COMPAQ DESKPRO 386" computer with two megabytes of memory and a 40-megabyte hard disk.

VOICE RECOGNITION SUBSYSTEM

The VoiceScribe-1000 Speech Recognition System manufactured by Cherry Corporation of Waukegan, IL, and developed by Dragon System, Inc. of Newton, MA, was used. This is a discrete utterance, speaker dependent, recognition system. Table I lists the vocabulary of the voice input subsystem. This vocabulary matches the parameters used in the production rules of the knowledge-based subsystem. They are descriptive words and phrases taken from the Standards (supra) and in the *Meat Evaluation Handbook* (supra).

Since the voice recognition subsystem is speaker dependent, a grader must "train" the system to his or her voice for each word or phrase in the vocabulary. The voice patterns of these training words are saved on computer hard disk for routine usage.

After all of the patterns are formed, recognition can be activated. Once in recognition mode, a pattern is formed for the incoming utterance and is compared to all of the reference patterns in the active vocabulary. The word or phrase that matches the incoming pattern with the highest correlation score is considered the "winning" word or phrase. If the score exceeds the reject threshold, the speech driver outputs the results to the computer as if they were typed in through the keyboard.

The prompts in the program which solicit a response by voice input from the grader are as follows:
Enter, the following for quality grade
carcass-id (ID code)
marbling-is? (abundant, moderate, modest, small, traces, etc.)
maturity-is? (A B C D E)
firmness-is? (firm, slightly-firm, mod-firm, soft, etc.)
color-is? (light-red, mod-light-red, cherry-red, etc.)
texture-is? (very-fine, fine, mod-fine, slightly-coarse, etc.)
Enter, the following for calculating the yield grade
carcass-weight-is (numerical value)
back-fat-is (numerical value)
rib-eye-area-is (numerical value)
kph-fat-is (numerical value)
Optionally, enter, the following to input preliminary yield grade, then optionally adjust up or down
yield-grade-is (numerical value)
or back-fat-is (numerical value)
adjust-by (numerical value)
Enter, the command . . . finished
A complete printout of the operating instructions for the meat grading production system is set forth in Appendix A, below.

KNOWLEDGE-BASED SUBSYSTEM IN CLIPS

CLIPS, which is created by the Artificial Intelligence Section of the Mission Planning and Analysis Division at NASA/Johnson Space Center, is a development and delivery expert system tool. It is currently in widespread public and private use and is available from Cosmic, 382 East Broad Street, Athens, GA 30602. CLIPS provides a complete environment for the construction of rule-based expert systems. Its inference engine uses forward-chaining problem-solving strategy, based on the Rete algorithm. It is written in 'C' language for portability, high speed, and high performance. Knowledge-bases can be compiled into CLIPS to produce turnkey executable programs.

CLIPS is a data-driven program where facts are the data that stimulate execution. Thus, the production rules can read any input, at any time. Also when the program reads input, the input is asserted into the fact-list, some of the production rules are processed, and all the matched facts are put into a conflict set, immediately; thereby permitting rapid processing. Most of the facts needed to arrive at a grade are coded into the working memory; and additional knowledge is asserted into the memory only when it is needed.

CLIPS also provides a utility called Cross Reference, Style, and Verification (CRVS). This utility comprises basic software development aids such as cross-referencing of relations and style checking and the ability to aid in the process of verifying the knowledge-base, which greatly improves the efficiency of the program.

Although the production system computations depend on the data inputs, some controls are needed for efficient operation. This is accomplished by organizing all the rules into different frames such as quality-frame, maturity-frame, and yield-frame. The frame is evoked only when it is needed for obtaining the desired goal or subgoal, by asserting the frame. The frame is retracted when the goal or subgoal is obtained. Some facts are asserted into the fact-list by the production rule when they are needed. These operations are orchestrated by the inference engine control.

For the present application of grading beef carcasses, the knowledge base in the CLIPS program is equipped with the vocabulary of Table I together with two sets of facts in the fact-list. Table II, below, is a first set of facts installed in the program, specifying values for classes and grades of carcass beef as well as values for the carcass characteristic parameters (degree of marbling, degree of firmness, and maturity) used in arriving at the quality grade. Table III, below, is a second set of facts relating to carcass beef grade parameters and their possible marbling and maturity values. The facts in these Tables are used for both verifying the voice input and in changing the grade up or down one or more steps. They are asserted when a reset is performed. For example, the fact that high-choice beef can be moderate marbling and A or B maturity is asserted into the fact-list and the fact that values for marbling can be abundant, moderate abundant, slightly abundant, moderate, modest, slight, traces, and practically devoid is also asserted into the fact-list.

TABLE I

Vocabulary Used in Meat Grading Expert System zero one two three four five six seven eight nine ten
eleven twelve
hundred plus minus plus point  minus-point point finished
not-finished
carcass-id-no,
carcass-number,
id-number,
marbling-is (abundant, mod-abundant, slightly-abundant, moderate, TABLE I-continued Vocabulary Used in Meat Grading Expert System modest, small, slight, traces, practically-devoid,
  devoid, next),
maturity-is (alpha, bravo, charlie, delta, echo, next),
skeletal-maturity-is (alpha, bravo, charlie, delta, echo, next),
chine-bone-is (red-and-porous, slightly-red-and-soft,
tinged-with-red,
  moderately-hard-white, hard-white, flinty, not-ossified,
  slightly-ossified, mod-ossified, mostly-ossified,
  comp-ossified, next),
thoracic-is (not-ossified, slightly-ossified, mod-ossified,
  mostly-ossified, comp-ossified, next),
cartilage-outline-is (plainly-visible, barely-visible, next),
lumbar-is (not-ossified, slightly-ossified, mod-ossified,
  mostly-ossified, comp-ossified, next),
sacrum-is (not-fused, fused, not-ossified, slightly-ossified,
  mod-ossified, mostly-ossified, comp-ossified, next),
lean-maturity-is (alpha, bravo, charlie, delta, echo, next),
color-is (bleached-red, light-red, moderately-light-red, cherry-red,
  slightly-dark-red, moderately-dark-red, dark-red,
  very-dark-red, next),
texture-is (very-fine, fine, moderately-fine, slightly-coarse, coarse,
  very-coarse, next),
firmness-is (firm, moderately-firm, slightly-firm,
  slightly-soft, moderately-soft, soft, very-soft, next),
yield-grade-is,
back-fat,
fat-thickeness,
carcass-weight,
total-weight,
rib-eye,
rib-eye-area,
kph-fat,
internal-fat,
adjust-by,
dark-cutter-is (slightly-dark, moderate-dark, dark, black, next),
class-is (cow, bull, bullock, veal, steer, heifer, next),
continue;

TABLE II

Some Facts About Carcass Beef (deffacts beef-data "This is a knowledge base of facts about beef."
(value-for class-is steer heifer cow bullock bull)
(value-for young-grades PRIME HIGH-CHOICE MEDIUM-CHOICE LOW-CHOICE
SELECT HIGH-STANDARD LOW-STANDARD UTILITY)
(value-for older-grades COMMERCIAL UTILITY CUTTER CANNER)
(value-for marbling-is abundant mod-abundant slightly-abundant
moderate modest small slight traces prac-devoid devoid)
(value-for maturity-is A B C D E)
(vaue-for firmness-is firm mod-firm slightly-firm slightly-soft
mod-soft soft very-soft)
(value-for color-is bleached-red light-red mod-light-red cherry-red
slightly-dark-red mod-dark-red dark-red very-dark-red)
(value-for texture-is very-fine fine mod-fine slightly-coarse coarse
very-coarse)
(value-for finished-is yes no)
(value-for chine-bone-is not-ossified slightly-ossified mod-ossified
mostly-ossified comp-ossified)
(value-for sacrum-is not-ossified slightly-ossified mod-ossified
mostly-ossified comp-ossified)
(value-for lumbar-is not-ossified slightly-ossified mod-ossified
mostly-ossified comp-ossified)
(value for thoracic-is not-ossified slightly-ossified mod-ossified
mostly-ossified comp ossified)
(value-for dark-cutter-is slightly-dark mod-dark dark black)
)

TABLE III

Some Facts About Quality Grades and Permitted Marbling and Maturity (deffacts quality-parameters "This is a knowledge base with
facts about quality grades."
(qal-parm PRIME abundant mod-abundant slightly-abundant A B)
(qual-parm HIGH-CHOICE moderate A B)
(qual-parm MEDIUM-CHOICE modest A B)

TABLE III-continued

Some Facts About Quality Grades and Permitted Marbling and Maturity (qal-parm LOW-CHOICE small A B)
(qual-parm SELECT slight A B)
(qual-parm HIGH-STANDARD traces A B)
(qal-parm LOW-STANDARD prac-devoid A B)
(qal-parm COMMERCIAL abundant mod-abundant slightly-abundant moderate modest small C D E)
)

The CLIPS program employs 61 production rules including the validation rules and the grading rules as set forth in the program printout attached as Appendix B. One rule is written so that the input of the carcass identification number is asserted to be the first fact. This identification number subsequently becomes the file name for storing carcass data and resulting grades.

The voice-input or keyboard input data are checked for their validity by the validation rules. Most parameter inputs are also checked. The invalid inputs are removed, while the valid inputs are converted to multifield variables. The production rule performing this task is fired first because of its high salience value. When the last input, 'finished,' is given, the quality frame for evaluating quality of the carcass is evoked.

DETERMINATION OF QUALITY GRADE

The quality grade of beef carcass is conventionally determined by the degree of marbling and firmness as observed on the cut surface of the rib-eye, in relation to the maturity of the carcass. In the present system, the meat grader inputs the degree of marbling on the exposed rib-eye. If the firmness of the lean tissue is not entered, the knowledge-based system assumes that it is comparably developed with the degree of marbling, and the quality will be determined on maturity and marbling alone. This is done by matching the marbling and maturity with knowledge listed in the quality-parameter fact-list (Table III) and arriving at a preliminary quality grade.

Maturity can be arrived at in three different ways. Firstly, it can be directly input with a letter degree such as A, B, C, D, or E. Secondly, if maturity is not known, then skeletal and/or lean characteristics, such as conditions of the chine bones, vertebrae, rib bones, and color and texture of the meat are input. This approach is taken when the grader cannot decide on a letter stage of maturity for the carcass, usually because the stage of maturity is on the borderline between two stages. At this point, the maturity frame is evoked and the facts of possible skeletal characteristics are asserted and checked against the inputs of the skeletal characteristics by the meat grader. The maturity is then determined by the conditions of the bones, with emphasis being placed on the conditions of the chine bone, followed by the thoracic vertebrae, lumbar vertebrae, and sacral vertebrae. However, if the conditions of lean maturity are also input, then meat color and meat texture are also used to determine the maturity of the carcass. The latter parameters are used mostly to decide different percents of the same stage of maturity. Thirdly, if no letter maturity or skeletal characteristics are entered, a default value of 'A' is assigned for the stage of maturity.

For maturity groups besides 'A,' an increase in degree of marbling is required to compensate for the progressive increase in maturity in each grade. To accommodate this feature, the grader should include a numeric value for the degree of marbling and stage of maturity inputs to the knowledge-based system. For example, an input of "B 80" indicates that the degree of maturity is 80% of the way between an "A 100" or "B 0" and a "B 100" or "C 0" carcass. If no percent is in the input, the system assumes the percent to be 100. If a skeletal feature with a specific condition is input, then a fact list, pertaining to that feature is asserted into working memory. This fact list contains the feature, its possible physical conditions, and the stage of maturity that relate to that condition.

Once the stage of maturity has been determined and the degree of marbling has been input, the quality frame is reasserted and the quality grade is determined by rules which correspond to FIG. 1, page 11 of the Standards, supra, herein incorporated by reference. When the check-firmness frame is evoked, rules are used to check if firmness complies with maturity and marbling conditions. If not, a rule is fired to decrease the preliminary quality grade. This is done by asserting the facts for the necessary conditions for each grade and comparing with the input firmness parameter.

Rules are provided for downgrading the quality grade if the carcass class is either from cow or is dark cutting beef; and the quality grade is eliminated if the carcass class is bull, because bulls are not eligible for a quality grade.

DETERMINATION OF YIELD GRADE

When the quality grade is determined, the yield frame is evoked by asserting the fact of yield-frame. The yield grade of the carcass is determined based on the values of the carcass weight; the backfat thickness on the exposed rib-eye; the percent kidney, pelvic, and heart (KPH) fat; and the area of the rib-eye. A direct method of computation is employed if all four of these facts are input by the meat grader. The results are obtained according to the formula described in the *Meat Evaluation Handbook* (supra). If the rib-eye area is not known, a rib-eye area is computed by its body weight. If the KPH fat is not given, a default value of 3.5% is assigned. For the indirect method of computing the yield grade, the meat grader may elect to give either a preliminary yield grade or else a backfat thickness from which the program computes the preliminary yield grade. In either case, the preliminary yield grade can be further adjusted up or down by the meat grader with numerical inputs or subjective estimates of the rib-eye area and KPH fat.

The system described above was used to grade two carcasses. The input data and the grade analyses are shown in Table IV. This system completed processing the final yield and quality grades in real time, without taking any measurable time right after the last input ('finished') was given by the meat grader. Thus, the limiting factor for the speed of processing was the amount of time required to vocally input the values and characteristics of a carcass.

With this system, a trained carcass characteristics inspector could perform the task of a certified meat grader. The system would relieve the person responsible for grading from the intensive mental work in assigning the grades to the carcasses. Since the computer is doing the reasoning, the process would not deteriorate after long hours of continuous work. It is expected that the time required to grade a carcass will be greatly reduced as the grader acquires experience and becomes more familiar with the system.

Since the rules are based on the specifications of the official meat grading rules, the resulting grades should always be equally or more consistent than those assigned by human meat graders. This will result in more equitable grades. However, the consistency of the final yield or quality grades is dependent on the consistency of the meat characteristics observed by the meat graders. The rules are easily changed or upgraded to implement new standards. Also, the meat characteristics and yield and quality grades are permanently recorded and processes of the decision making can be easily reviewed. This system not only can be used on the industrial livestock kill floor, but is also very useful as a training tool for the future meat graders.

TABLE IV
Computer Outputs by the Expert System in CLIPS
EXPERT MEAT GRADING SYSTEM
U.S. MEAT ANIMAL RESEARCH CENTER The following data was input by the grader.
carcass-id 101
marbling-is modest 80
color-is cherry-red 0
The charactestics of the lean indicate A87.5 maturity!
texture-is fine 0
chine-bone-is slightly-ossified 0
sacrum-is mostly- ossified 0

TABLE IV-continued
Computer Outputs by the Expert System in CLIPS
EXPERT MEAT GRADING SYSTEM
U.S. MEAT ANIMAL RESEARCH CENTER carcass-weight-is 680
back-fat-is 0.44
kph-fat-is 2.2
rib-eye-area-is 12.10
The lean maturity is A87.5
The skeletal maturity is A90
Based on skeletal and lean features the maturity appears to be A88.75!
The quality grade of this carcass
based on marbling and overall maturity is MEDIUM-CHOICE
The yield grade is 2.80
The following data was input by the grader.
carcass-id 102
marbling-is small 90
maturity-is A80
color-is cherry-red 0
The characteristics of the lean indicate A87.5 maturity!
texture-is fine 0
firmness-is firm 0
yield-grade-is 2.5
adjustment-is 0.2
The quality grade of this carcass
based on marbling and overall maturity is LOW-CHOICE
The adjusted yield grade is 2.70

APPENDIX A

Instructions to manually operate the Expert system.

Change to directory C:\CLIPS> Enter the command 'CLIPS'.

At the CLIPS> prompt, enter the command  (load "grader.clp")

At the CLIPS> prompt, enter the command (reset)

At the CLIPS> prompt, enter the command (run)

Enter, the following for quality grade

```
carcass-id    ###
marbling-is ? (abundant,moderate,modest,small,traces,etc)
maturity-is ? (A B C D E)
firmness-is ? (firm,slightly-firm,mod-firm,soft,etc)
color-is    ? (light-red,mod-light-red,cherry-red,etc)
texture-is  ?(very-fine,fine,mod-fine,slightly-coarse,etc)
```

Enter, the following for calculating the yield grade

```
carcass-weight-is   ###
back-fat-is         #.##
rib-eye-area-is     ##.##
kph-fat-is          #.##
```

Enter, the following to input, then adjust the yield grade

```
yield-grade-is      #.##
or
back-fat-is         #.##
adjust-by           #.##    (an adjustment is optional).
```

Enter, the command ... finished-is yes

To run another 'carcass'

Enter, at the CLIPS> prompt... (reset)

Enter, at the CLIPS> prompt... (run)

and start over with ... carcass-id ###

APPENDIX B

```
;;;===============================================================
;;;    Meat grading expert system     USMARC
;;;
;;;    CLIPS ver 4.2
;;;    November 28, 1988
;;;
;;;    Y.R. Chen,  S.A.Robinson
;;;
;;;    This version is used to explain the workings of this program.
;;;    Although it is a working program, its main purpose is to explain
;;;    what the rules are supposed to be doing.  Although variables may
;;;    be named the same from rule to rule, this is done only for clarity
;;;    and ease of understanding, since variables are specific to the rule
;;;    in which they are found.
;;;
;;;===============================================================

;;;===============================================================
;;; assert some facts about beef carcasses
;;;
;;; This is a fact list which contains known facts about beef carcasses.
;;; It lists classes and grades of beef, as well as the parameters used
;;; in grading beef and their possible values.  These lists are used for
;;; both verifying the voice input and in changing the grade up or down
;;; one or more steps.  This fact list is asserted when a reset is
;;; performed.
;;;
;;;===============================================================

(deffacts beef-data "This is a knowledge base of facts about beef."
      (value-for class-is steer heifer cow bullock bull)
      (value-for young-grades PRIME HIGH-CHOICE MEDIUM-CHOICE LOW-CHOICE
          SELECT HIGH-STANDARD LOW-STANDARD UTILITY)
      (value-for older-grades COMMERCIAL UTILITY CUTTER CANNER)
      (value-for marbling-is abundant mod-abundant slightly-abundant
          moderate modest small slight traces prac-devoid
          devoid)
      (value-for maturity-is A B C D E )
      (value-for firmness-is firm mod-firm slightly-firm slightly-soft
          mod-soft soft very-soft)
      (value-for color-is bleached-red light-red mod-light-red cherry-red
          slightly-dark-red mod-dark-red dark-red very-dark-red)
      (value-for texture-is very-fine fine mod-fine slightly-coarse
          coarse very-coarse)
```

```
        (value-for finished-is yes no)
        (value-for chine-bone-is not-ossified slightly-ossified
            mod-ossified mostly-ossified comp-ossified)
        (value-for sacrum-is not-ossified slightly-ossified mod-ossified
            mostly-ossified comp-ossified)
        (value-for lumbar-is not-ossified slightly-ossified mod-ossified
            mostly-ossified comp-ossified)

(value-for thoracic-is not-ossified slightly-ossified mod-ossified
            mostly-ossified comp-ossified)
        (value-for dark-cutter-is slightly-dark mod-dark dark black)
        )

;;;===========================================================
;;;
;;; assert some facts about quality grades and permitted maturities
;;;
;;; This fact lists contains data that determines what degree of marbling
;;; and maturity are associated with different quality grades.  Such as
;;; the first one which is PRIME (quality grade) must have marbling which
;;; is slightly abundant or better, and a maturity of A or B. This fact
;;; list is also asserted at reset time.
;;;===========================================================

(deffacts quality-parameters "This is a knowledge base with facts about
        quality."
        (qual-parm PRIME abundant mod-abundant slightly-abundant A B)
        (qual-parm HIGH-CHOICE moderate A B)
        (qual-parm MEDIUM-CHOICE modest A B)
        (qual-parm LOW-CHOICE small A B)
        (qual-parm SELECT slight A B)
        (qual-parm HIGH-STANDARD traces A B)
        (qual-parm LOW-STANDARD prac-devoid A B)
        (qual-parm COMMERCIAL abundant mod-abundant slightly-abundant
            moderate modest small C D E)
        )

;;;===========================================================
;;; This rule checks for accurate input and removes some data if it is
;;; not verified by the facts in the first fact list, it then warns the
;;; grader that a parameter was given an unrecognized value.  This rule
;;; fires only on data listed with the Value-for parameter.

(defrule remove-bad-input-data ""
        (declare (salience 20))
        ?bad-data <- (input ?variable ?value $?)
        (value-for ?variable $?list)
        (test (! (member ?value $?list)))
=>
        (retract ?bad-data)
        (fprintout t crlf "*************** CAUTION ********************")
        (fprintout t crlf "Input data was not understood, please try
            again!"crlf)
        )

;;;===========================================================
```

```
;;; If data is accepted by readline then it is changed to this format
;;; -- the ?variable ?value $?num, as an example it may indicate
;;;    the chine-bone-is slightly-ossified 20

(defrule use-good-data ""
      (declare (salience 10))
      ?good-data <- (input ?variable ?value $?num)
      (value-for ?variable $?list)
      (test (member ?value $?list))
=>
      (retract ?good-data)
      (assert (the ?variable ?value $?num))
      )

;;;===========================================================================
;;; The purpose of this rule is to make sure the first data accepted is
;;; the carcass identification number, which will also be used as a file
;;; name for storing the data.  It removes the initial-fact tells the
;;; system to print out the heading and open the output ports for writing
;;; It also sets or resets the gensym function to one, for each carcass.

(defrule first-input-carcass-id ""
      ?begin <- (initial-fact)
      ?input <- (input carcass-id $?num)
=>
      (retract ?begin ?input)
      (assert (the carcass-id $?num))
      (assert (print-heading))
      (setgen 1)
      )
;;;===========================================================================
;;; This rule checks to see if each valid parameter has a percentage or
;;; degree of development associated with it, if not it assigns the value
;;; of zero to it. It also duplicates the data for output to a data file.
;;; This is done for consistency in the data's format.

(defrule check-for-degree ""
      (declare (salience 20))
      ?needs-degree <- (input ?variable ?value)
      ?file-data-also <- (data ?variable ?value)
      (value-for ?variable&:(neq ?variable finished-is) $?)
      (not (input ?variable ?value ?num&:(numberp ?num)))
=>
      (retract ?needs-degree ?file-data-also)
      (assert (input ?variable ?value 0))
      (assert (data ?variable ?value 0))
      )

;;;===========================================================================
;;; This section controls the reading and formating of the initial data
;;; input. It rec. voice input & convert to multi-field vari., when the
;;; statement 'finished-is yes' is asserted no more input will be read
;;;===========================================================================

;;;===========================================================================
;;; This rule reads the data from standard input t (the keyboard buffer)
;;; using the readline function.  Once the grader says he is finished,
```

```
;;; data will no longer be read, unless the grader says not-finished
;;; before continuing to the next carcass.

(defrule read-input-data ""
      ?input <- (more-input)
      (not (the finished-is yes))
=>
      (retract ?input)
      (bind ?read-data (readline t))
      (assert (input =(str-explode ?read-data)))
      (assert (data =(str-explode ?read-data)))
      )

;;;=====================================================================
;;; This rule is used to continually re-assert more-input so data will be
;;; read as long as   'not (the finished-is yes)' it also indicates on
;;; standard output that the system is ready for input.
(defrule accept-more-input ""
      (not (the finished-is yes))
      (not (more-input))
=>
      (fprintout t "" crlf crlf)
      (fprintout t "--------------------------------------------------" crlf)
      (fprintout t "   **************** READAY *****************" crlf)
      (fprintout t "--------------------------------------------------" crlf
         crlf)
      (assert (more-input))
      )
;;;=====================================================================
;;; The system retards the processing of most of the data until the
;;; grader indicates he is finished inputing data, this rule activates
;;; the quality frame for processing.  This frame based process may be
;;; changed in the future in order to increase the speed and efficiency
;;; of the program.  Some pattern matching is allowed to take place
;;; during data input, so that preliminary findings are completed when as
;;; soon as enough facts are known.

(defrule open-quality-frame ""
      (the finished-is yes)
=>
      (assert (quality-frame))
      )

;;;=====================================================================
;;; This rule creates a data file and stores the input,
;;; the filename is the carcass id number, the file is closed on
;;; the command 'finished-is yes'.  Two output ports are opened; one is
;;; a file on the disk and one is the printer port.

(defrule open-data-file ""
      (declare (salience 10))
      ?open-files <- (print-heading)
      (the carcass-id $?num)
=>
      (retract ?open-files)
```

```
        (bind ?file-name (str-implode $?num))
        (open ?file-name data-file "w")
        (open "lpt1" prn "w")
        (fprintout prn crlf crlf
            "****************************************************")
        (fprintout prn crlf "*********** EXPERT MEAT GRADING SYSTEM
            **********")
        (fprintout prn crlf "******** U.S.MEAT ANIMAL RESEARCH CENTER
            ********" crlf crlf)
        (fprintout prn "The following data was input by the grader." crlf)
        (fprintout t crlf
            "****************************************************")
        (fprintout t crlf "Begin entering data for carcass number "
            ?file-name )
        (fprintout t crlf
            "****************************************************" crlf)
        (assert (the file-is-open))
        )

;;; ================================================================
;;; This rule ascertains that data has been properly formated for storage
;;; that the file is open and the grader is not finished (defrule write-data-to-file ""
        ?write-data <- (data $?input-data)
        (the file-is-open)
        (not (the finished-is yes))
=>
        (retract ?write-data)
        (fprintout data-file $?input-data crlf)
        (fprintout prn $?input-data crlf)
        )

;;; ================================================================
;;; This ascertains that yield and quality grades have been determined
;;; and that the grader is finished.  It then closes all open files and
;;; sends a closing statement to standard output.

(defrule close-files ""
        (yield-grade-is ?)
        (quality-grade-is ? $?)
        (the finished-is yes)
=>
        (close)
        (assert (the grading-is done))
        (fprintout t crlf
            "****************************************************")
        (fprintout t crlf "This carcass has been graded for QUALITY &
            YIELD")
        (fprintout t crlf "Say the word CONTINUE  to grade another
            carcass.")
        (fprintout t crlf
            "****************************************************" crlf crlf)
        )

;;; ================================================================
```

```
;;; If the grading has been completed, but for some reason the grader
;;; wants to add more data this rule will reopen the last file for more
;;; input.

(defrule reopen-the-files ""
      ?reopen <- (the grading-is done)
      ?input <- (input more-input)
      (the carcass-id $?num)
  =>
      (retract ?reopen ?input)
      (bind ?file-name (str-implode $?num))
      (open ?file-name data-file "a")
      (open "lpt1" prn "w")
      (fprintout t crlf
            "-------------------------------------------------")
      (fprintout t crlf "The files for carcass " $?num " have been
            reopened, ")
      (fprintout t crlf "you may continue.")
      (fprintout t crlf
            "-------------------------------------------------")
      )

;;;=====================================================================
;;; This rule removes the finished statement and reactivates the system
;;; to recieve more data inputs.

(defrule I-want-to-say-more ""
      ?finished <- (the finished-is yes)
      (input more-input)
  =>
      (retract ?finished)
      (assert (more-input))
      (fprintout t
            "**************************************************" crlf)
      (fprintout t "Go ahead and enter more data, if you wish to
            continue" crlf)
      (fprintout t "if you want to start over, then say START OVER "
            crlf)
      (fprintout t
            "**************************************************" crlf
            crlf)
      )

;;;=====================================================================
;;; Rules to determine quality grade when marbling and maturity are known
;;; Marbling has to be input, maturity can be input or determined from
;;; skeletal & lean characteristics input by the grader
;;;=====================================================================
;;; This rule asserts some facts about when percent marbling should
;;; be greater than degree maturity.  This way these facts are asserted
;;; only if the maturity is not A and the quality grade has not yet been
;;; determined.
;;;=====================================================================

(defrule not-A-maturity ""
```

```
        (quality-frame)
        (the maturity-is ~A ? $?)
        (not (quality-grade-is ? $?))
=>
        (assert
        (sloped-line slighlty-abundant B)
        (sloped-line moderate E)
        (sloped-line modest D)
        (sloped-line small B C)
        (sloped-line slight B E)
        (sloped-line traces D)
        (sloped-line prac-devoid B C E)
        (sloped-line devoid B))
        )
```

```
;;;===========================================================
;;; This rule determines quality when maturity is known to be 'A'
;;; and the marbling is known. The grade is determined by matching the
;;; marbling and maturity with knowledge listed in the quality-parameters
;;; fact list.  This rule also closes the quality frame and opens the
;;; yield frame and allows the system to check to make sure firmness is
;;; in line with quality.

(defrule quality-001 ""
        ?frame <- (quality-frame)
        (the marbling-is ?marb ?percent)
        (the maturity-is A $?)
        (qual-parm ?grade $?list)
        (test (member ?marb $?list))
=>
        (retract ?frame)
        (assert (quality-grade-is ?grade ?percent))
        (fprintout prn crlf "The quality grade of this carcass" crlf "based
            on marbling & over-all maturity is " ?grade crlf)
        (fprintout t crlf "The quality grade appears to be " ?grade crlf)
        (assert (yield-frame))
        (assert (check-firmness))
        )
```

```
;;;===========================================================
;;; This rule determines quality when the maturity is 'A' and the
;;; percent of marbling exceeds the degree of maturity.  It is similar
;;; to the previous rule, however it tests to see if marbling score is
;;; higher than maturity.  If it is, then no problem, and it asserts the
;;; quality grade.

(defrule quality-002 ""
        ?frame <- (quality-frame)
        (the marbling-is ?marb ?percent)
        (the maturity-is ?mat&~A ?deg $?)
        (test (>= ?percent ?deg))
        (qual-parm ?grade $?list)
        (test (member ?marb $?list))
        (test (member ?mat $?list))
=>
        (retract ?frame)
        (assert (quality-grade-is ?grade ?percent))
```

```
      (fprintout prn crlf "The quality grade of this carcass" crlf "based
           on marbling & over-all maturity is " ?grade crlf)
      (fprintout t crlf "The quality grade appears to be " ?grade)
      (assert (yield-frame))
      (assert (check-firmness))
      )
```

```
;;;===============================================================
;;; This rule is similar to the other two, however it deals with only B
;;; maturity and only if the marbling score is less than the degree of
;;; maturity.  If it is, it must take the quality grade from value-for
;;; young-grades fact list, and move down the list one step to get the
;;; reduced quality grade.

(defrule quality-003 ""
      ?frame <- (quality-frame)
      (the marbling-is ?marb ?percent)
      (the maturity-is B ?deg $?)
      (test (< ?percent ?deg))
      (sloped-line $?slope-list)
      (test (member ?marb $?slope-list))
      (qual-parm ?grade $?list)
      (test (member ?marb $?list))
      (value-for young-grades $?grade-list)
      (test (member ?grade $?grade-list))
=>
      (retract ?frame)
      (bind ?old-grade (member ?grade $?grade-list))
      (bind ?new-grade (nth (+ 1 ?old-grade) $?grade-list))
      (assert (quality-grade-is ?new-grade ?percent))
      (fprintout prn crlf "The quality grade of this carcass" crlf
           "based on marbling & over-all maturity is " ?new-grade crlf)
      (fprintout t crlf"The quality grade appears to be " ?new-grade
           crlf)
      (assert (yield-frame))
      (assert (check-firmness))
      )
```

```
;;;===============================================================
;;; This rule is similar to 003 however it deals with the older
;;; carcasses, anything that is not A or B.

(defrule quality-004 ""
      ?frame <- (quality-frame)
      (the marbling-is ?marb ?percent)
      (the maturity-is ~A&~B ?deg $?)
      (test (< ?percent ?deg))
      (sloped-line $?slope-list)
      (test (member ?marb $?slope-list))
      (qual-parm ?grade $?list)
      (test (member ?marb $?list))
      (value-for older-grades $?grade-list)
      (test (member ?grade $?grade-list))
=>
      (retract ?frame)
      (bind ?old-grade (member ?grade $?grade-list))
      (bind ?new-grade (nth (+ 1 ?old-grade) $?grade-list))
```

```
       (assert (quality-grade-is ?new-grade ?percent))
       (fprintout prn crlf "The quality grade of this carcass" crlf "based
            on marbling & over-all maturity is " ?new-grade crlf)
       (fprintout t crlf "The quality grade appears to be " ?new-grade
            crlf)
       (assert (yield-frame))
       (assert (check-firmness))
       )

;;;==============================================================
;;; This rule handles the special case of a rib eye with abundant or
;;; moderately abundant marbling and A or B maturity.

(defrule special-case-prime-quality ""
       ?frame <- (quality-frame)
       (the marbling-is abundant|mod-abundant ?percent)
       (the maturity-is A|B $?)
  =>
       (retract ?frame)
       (assert (quality-grade-is PRIME ?percent))
       )

;;;==============================================================
;;; Rules for the modification of the quality grade
;;;==============================================================

;;;==============================================================
;;; This is a special case rule, in which a cow carcass which in not
;;; eligible for PRIME grade, actually graded that good.

(defrule if-it-is-a-cow ""
       (the class-is cow ?)
       ?quality-grade <- (quality-grade-is PRIME ?)
  =>
       (retract ?quality-grade)
       (assert (quality-grade-is HIGH-CHOICE 100))
       (fprintout prn crlf "The carcass class was input as cow, because of
            this. " crlf)
       (fprintout prn "the quality grade was reduced from PRIME to HIGH
            CHOICE. " crlf)
       )

;;;==============================================================
;;; This rule makes sure that a class of beef input as bullock really is
;;; young enough to be classified as bullock and not bull.

(defrule is-it-a-bullock ""
       ?too-old <- (the class-is bullock ?)
       (the maturity-is ~A&B|C|D|E ? $?)
  =>
       (retract ?too-old)
       (assert (the class-is bull 0))
       (fprintout t crlf "Bullocks may be no older than A maturity." crlf)
       (fprintout prn crlf "Bullocks may be no older than A maturity. "
            crlf "So class will be changed to Bull." crlf)
       )
```

;;;=================================================================
;;; This rule sets quality grade to BULL-CARCASS if the class is bull,
;;; this is because bulls are not quality graded only yield graded.

```
(defrule we-dont-grade-bulls ""
      ?remove <- (quality-frame)
      (the class-is bull ?)
      (the finished-is yes)
 =>
      (retract ?remove)
      (assert (yield-frame))
      (assert (quality-grade-is BULL-CARCASS))
      (fprintout t crlf "Bull carcasses are not quality graded." crlf)
      (fprintout prn crlf "Bull carcasses are not quality graded. " crlf)
      )
```

;;;=================================================================
;;; This rule asserts facts about carcasses effected by dark cutting.
;;; It lists which grades may be reduced by one full or one half grade,
;;; and the percentage reduction associated with the four symbolic
;;; degrees of dark cutting.

```
(defrule dark-cutting-beef ""
      (the dark-cutter-is ? ?)
=>
      (assert
         (reduce-by one-full-grade PRIME HIGH-CHOICE MEDIUM-CHOICE
         LOW-CHOICE SELECT STANDARD)
         (reduce-by one-half-grade STANDARD COMMERCIAL UTILITY)
         (reduce-by a-percentage   slightly-dark 25)
         (reduce-by a-percentage mod-dark 50 )
         (reduce-by a-percentage dark 75)
         (reduce-by a-percentage black 100) )
      )
```

;;;=================================================================
;;; This rule fires if its a dark cutter and the grade is one of those
;;; that can be reduced by up to one full grade (p.12 of the standards)
;;; the grade is reduced by the percent indicated in the previous rule.

```
(defrule reduce-up-to-one-grade ""
      ?dark-cutter <- (the dark-cutter-is ?value 0)
      ?quality-grade <- (quality-grade-is ?grade&:(neq ?grade STANDARD)
          ?percentage)
      (reduce-by one-full-grade $?grade-list)
      (test (member ?grade $?grade-list))
      (reduce-by a-percentage ?value ?num)
=>
      (retract ?quality-grade ?dark-cutter)
      (bind ?new-num (- ?percentage ?num))
      (if (> ?new-num 0)
           then (assert (quality-grade-is ?grade ?new-num))
           else  (bind ?old-grade (member ?grade $?grade-list))
             (bind ?new-grade   (nth (+ 1 ?old-grade) $?grade-list))
             (bind ?new-num (+ 100 ?new-num))
             (assert (quality-grade-is ?new-grade ?new-num)))
```

```
        (fprintout prn "Due to the dark cutting condition of " ?value crlf)
        (fprintout prn "the quality grade is reduced to " ?new-grade crlf)
        (fprintout t "The quality grade adjusted for dark cutting is "
              ?new-grade crlf)
     )
```

;;;================================================================
;;; This rule is similar to the previous rule but only deals with the
;;; grades that may be reduced by one half of a full grade.

```
(defrule reduce-up-to-onehalf-grade ""
      ?dark-cutter <- (the dark-cutter-is ?value 0)
      ?quality-grade <- (quality-grade-is ?grade&:(neq ?grade UTILITY)
            ?percentage)
      (reduce-by one-half-grade $?grade-list)
      (test (member ?grade $?grade-list))
      (reduce-by a-percentage ?value ?num)
=>
      (retract ?dark-cutter ?quality-grade)
      (bind ?new-num (/ (- ?percentage ?num) 2))
      (if (> ?new-num 0)
            then (assert (quality-grade-is ?grade ?new-num))
            else (bind ?old-grade (member ?grade $?grade-list))
              (bind ?new-grade (nth (+ 1 ?old-grade) $?grade-list))
              (bind ?new-num (+ 100 ?new-num))
              (assert (quality-grade-is ?new-grade ?new-num)))
      (fprintout prn "Due to the dark cutting condition of " ?value crlf)
      (fprintout prn "the quality grade is reduced to " ?new-grade crlf)
      (fprintout t "The quality grade adjusted for dark cutting is "
            ?new-grade crlf)
   )
```

;;;================================================================
;;; This rule is used if the grader inputs a specific percent to reduce
;;; the quality grade of the carcass.

```
(defrule reduce-by-specified-amount ""
      ?dark-cutter <- (the dark-cutter-is ?value  ?deduct&:( > ?deduct
            0))
      ?quality-grade <- (quality-grade-is ?grade&:(neq ?grade STANDARD)
            ?percentage)
      (reduce-by one-full-grade $?grade-list)
      (test (member ?grade $?grade-list))
=>
      (retract ?dark-cutter ?quality-grade)
      (bind ?new-num (- ?percentage ?deduct) )
      (if (> ?new-num 0)
            then (assert (quality-grade-is ?grade ?new-num))
            else (bind ?old-grade (member ?grade $?grade-list))
              (bind ?new-grade (nth (+ 1 ?old-grade) $?grade-list))
              (bind ?new-num (+ 100 ?new-num))
              (assert (quality-grade-is ?new-grade ?new-num)))
      (fprintout prn "Due to the dark cutting condition of " ?value crlf)
      (fprintout prn "the quality grade is reduced to " ?new-grade crlf)
      (fprintout t "The quality grade adjusted for dark cutting is "
            ?new-grade crlf)
   )
```

```
;;;==========================================================================
;;; This rule is similar to the previous rule only it will only reduce
;;; the grade by up to one half of a full grade.

(defrule reduce-by-half-specified-amount ""
      ?dark-cutter <- (the dark-cutter-is ?value ?deduct&:( > ?deduct 0))
      ?quality-grade <- (quality-grade-is ?grade&:(neq ?grade UTILITY)
          ?percentage)
      (reduce-by one-half-grade $?grade-list)
      (test (member ?grade $?grade-list))
=>
      (retract ?dark-cutter ?quality-grade)
      (bind ?new-num (/ (- ?percentage ?deduct) 2))
      (if (> ?new-num 0)
         then (assert (quality-grade-is ?grade ?new-num))
         else (bind ?old-grade (member ?grade $?grade-list))
           (bind ?new-grade (nth (+ 1 ?grade) $?grade-list))
           (bind ?new-num (+ 100 ?new-num))
           (assert (quality-grade-is ?new-grade ?new-num)))
      (fprintout prn "Due to the dark cutting condition of " ?value crlf)
      (fprintout prn "the quality grade is reduced to " ?new-grade crlf)
      (fprintout t "The quality grade adjusted for dark cutting is "
          ?new-grade crlf)
)

;;;==========================================================================
;;; Rule to test for firmness characteristics
;;; If firmness does not comply with maturity & marbling, this rule
;;; will decrease quality by one grade.
;;; If firmness does meet the minimum requirements for the specified
;;; maturity, then this rule will not fire and nothing will be done.
;;;==========================================================================

;;;==========================================================================
;;; These next two rules do basically the same thing, they are seperated
;;; so that only facts needed will be asserted and memory will not be
;;; wasted on unnecessary knowledge.
;;; These rules are fired if quality grade has been determined and the
;;; grader inputs data about the firmness of the lean.

(defrule check-firmness-a-b ""
      ?check-firmness <- (check-firmness)
      (the firmness-is ? ?)
      (the maturity-is A|B ?)
=>
      (retract ?check-firmness)
      (assert (compare-firmness-database))
      (assert
      (firm-parm PRIME A B firm)
      (firm-parm HIGH-CHOICE A slightly-soft slightly-firm mod-firm firm)
      (firm-parm HIGH-CHOICE B slightly-firm mod-firm firm)
      (firm-parm MEDIUM-CHOICE A slightly-soft slightly-firm mod-firm
          firm)
      (firm-parm MEDIUM-CHOICE B slightly-firm mod-firm firm)
      (firm-parm LOW-CHOICE A slightly-soft slightly-firm mod-firm firm)
      (firm-parm LOW-CHOICE B slightly-firm mod-firm firm)
```

```
        (firm-parm SELECT A mod-soft slightly-soft slightly-firm
             mod-firm firm)
        (firm-parm SELECT B slightly-soft slightly-firm mod-firm firm)
        (firm-parm HIGH-STANDARD A soft mod-soft slightly-soft
             slightly-firm
             mod-firm firm)
        (firm-parm HIGH-STANDARD B mod-soft slighlty-soft slightly-firm
             mod-firm firm)
        (firm-parm LOW-STANDARD A soft mod-soft slightly-soft slightly-firm
             mod-firm firm)
        (firm-parm LOW-STANDARD B mod-soft slighlty-soft slightly-firm
             mod-firm firm) )
        )

(defrule firmness-values-for-c-d-e ""
        ?check-firmness <- (check-firmness)
        (the firmness-is ? ?)
        (the maturity-is C|D|E ?)
=>
        (retract ?check-firmness)
        (assert (compare-firmness-database))
        (assert
        (firm-parm COMMERCIAL C slightly-firm mod-firm firm)
        (firm-parm COMMERCIAL D mod-firm firm)
        (firm-parm COMMERCIAL E firm)
        (firm-parm UTILITY C soft mod-soft slightly-soft slightly-firm
             mod-firm firm)
        (firm-parm UTILITY D mod-soft slightly-soft slightly-firm
             mod-firm firm)
        (firm-parm UTILITY E slightly-firm mod-firm firm)
             )
        )

;;;===========================================================================
;;; This rule determines if a firmness parameter is input, and if so,
;;; will test it against the known facts to see if it is firm enough for
;;; the current quality grade. If the firmness is suitable, no rules are
;;; fired and the quality grade is left alone.  The rule fires only if
;;; the lean is too soft.

(defrule test-firmness-not-ok ""
        ?firmness-database <- (compare-firmness-database)
        (the firmness-is ?firm ? $?)
        (the maturity-is ?mat $?)
        ?old-quality-grade <- (quality-grade-is ?quality-grade $?)
        (firm-parm ?quality-grade $?list)
        (test (member ?mat $?list))
        (test (! (member ?firm $?list)))
        (value-for young-grades|older-grades $?grade-list)
        (test (member ?quality-grade $?grade-list))
=>
        (retract ?firmness-database)
        (retract ?old-quality-grade)
        (bind ?old-grade (member ?quality-grade $?grade-list))
        (bind ?modified-grade (nth (+ 1 ?old-grade) $?grade-list))
        (assert (quality-grade-is ?modified-grade))
```

```
        (fprintout prn crlf "*********************" crlf)
        (fprintout prn "The firmness of the rib eye was described as "
            ?firm " !" crlf )
        (fprintout prn "This is not compatible with the firmness
            requirements of the " ?quality-grade " grade" crlf)
        (fprintout prn "The quality grade has been modified to "
            ?modified-grade  " !" crlf)
    )
```

```
;;;==========================================================
;;; Rules for determining maturity if not given directly by grader.
;;; The first rules assert facts about specific bones and their degree
;;; of ossification, which indicates their approximate age.
;;;==========================================================

;;;==========================================================
;;; The purpose of this rule is to determine if a stage of maturity is
;;; known; and if not, then close the quality frame and open the maturity
;;; frame in order to determine the stage of maturity.

(defrule if-maturity-is-not-given ""
      ?quality-frame <- (quality-frame)
      (the finished-is yes)
      (not (the maturity-is ? $?))
=>
      (retract ?quality-frame)
      (assert (maturity-frame))
      )

;;;==========================================================
;;; This rule asserts a default A maturity if no information is given
;;; about the maturity of the carcass being graded.

(defrule default-to-A-maturity ""
      (maturity-frame)
      (the finished-is yes)
      (not (the maturity-is ? ? $?))
      (not (the chine-bone-is ? ?))
      (not ( the sacrum-is ? ?))
      (not (the lumbar-is ? ?))
      (not (the thoracic-is ? ?))
=>
      (assert (skeletal-maturity-is A 90 10))
      )

;;;==========================================================
;;; These next 4 rules assert facts known about skeletal features, only
;;; if they are needed and the maturity frame has been opened.

(defrule if-chine-bone-is-given ""
      (maturity-frame)
      (the chine-bone-is ? ?)
=>
      (assert (skelmat chine-bone-is not-ossified A 50)
         (skelmat chine-bone-is slightly-ossified B 0)
         (skelmat chine-bone-is slightly-ossified A 100)
```

```
            (skelmat chine-bone-is mod-ossified C 0)
            (skelmat chine-bone-is mod-ossified B 100)
            (skelmat chine-bone-is mostly-ossified D 0)
            (skelmat chine-bone-is mostly-ossified C 100)
            (skelmat chine-bone-is comp-ossified  E 0)
            (skelmat chine-bone-is comp-ossified D 100))
            )

(defrule if-sacrum-is-given ""
      (maturity-frame)
      (the sacrum-is ? ?)
=>
      (assert
            (skelmat sacrum-is not-ossified A 0)
            (skelmat sacrum-is slightly-ossified A 25)
            (skelmat sacrum-is mod-ossified A 50)
            (skelmat sacrum-is mostly-ossified A 75)
            (skelmat sacrum-is comp-ossified B 0)
            (skelmat sacrum-is comp-ossified A 100))
      )

(defrule if-lumbar-is-given ""
      (maturity-frame)
      (the lumbar-is ? ?)
=>
      (assert
            (skelmat lumbar-is not-ossified A 25)
            (skelmat lumbar-is slightly-ossified A 50)
            (skelmat lumbar-is mod-ossified A 75)
            (skelmat lumbar-is mostly-ossified B 0)
            (skelmat lumbar-is mostly-ossified A 100)
            (skelmat lumbar-is comp-ossified B 25))
      )

(defrule if-thoracic-is-given ""
      (maturity-frame)
      (the thoracic-is ? ?)
=>
      (assert
            (skelmat thoracic-is not-ossified A 50)
            (skelmat thoracic-is slightly-ossified B 0)
            (skelmat thoracic-is slightly-ossified A 100)
            (skelmat thoracic-is mod-ossified B 50)
            (skelmat thoracic-is mostly-ossified C 0)
            (skelmat thoracic-is mostly-ossified B 100)
            (skelmat thoracic-is comp-ossified D 0)
            (skelmat thoracic-is comp-ossified C 100) )
      )
;;;===========================================================================
;;; This rule retards processing of maturity data until all skeletal
;;; features in the fact list are considered.

(defrule get-all-the-inputs ""
      (maturity-frame)
      (the finished-is yes)
      ?last-one <- (is-this-all)
      (or  (not (the chine-bone-is ? ?))
```

```
            (not (the sacrum-is ? ?))
            (not (the lumbar-is ? ?))
            (not (the thoracic-is ? ?)))
=>
        (retract ?last-one)
        (assert (compare-the-ages))
        )

;;;===========================================================
;;; This rule matches the input data with the asserted skeletal maturity
;;; fact list just asserted and formats the output list for processing
;;; by the rules that determine the maturity.

(defrule maturity-001 ""
        ?maturity-frame <- (maturity-frame)
        (or  ?remove <- (the ?bone&:(eq ?bone chine-bone-is) ?value ?)
             ?remove <- (the ?bone&:(eq ?bone sacrum-is) ?value ?)
             ?remove <- (the ?bone&:(eq ?bone lumbar-is) ?value ?)
             ?remove <- (the ?bone&:(eq ?bone thoracic-is) ?value ?))
        (skelmat ?bone ?value ?letter ?num)
=>
        (retract ?remove ?maturity-frame)
        (fprintout t ?bone " " ?value " indicates " ?letter " " ?num
              " maturity " crlf)
        (assert (prelim-maturity =(gensym) ?bone ?letter ?num))
        (assert (maturity-frame))
        (assert (is-this-all))
        )

;;;===========================================================
;;; If skeletal maturity only can be determined, this rule
;;; determines overall maturity based only on these features.

(defrule maturity-002 ""
        ?maturity-frame <- (maturity-frame)
        (skeletal-maturity-is ?letter ?num ?confidence)
        (not (lean-maturity-is ? ?))
=>
        (retract ?maturity-frame)
        (assert (the maturity-is ?letter ?num ?confidence))
        (fprintout prn crlf "Based on skeletal features only the maturity
               appears to be " ?letter " " ?num " !" crlf)
        (assert (quality-frame))
        )

;;;===========================================================
;;; If skeletal & lean maturity can be determined these rules will assert
;;; maturity based 50/50 on skeletal and lean features.  This rule fires
;;; only if skeletal and lean maturity show the same maturity.

(defrule maturity-003 "skeletal & lean indicate the same age"
        ?maturity-frame <- (maturity-frame)
        (lean-maturity-is ?letter ?lnum)
        (skeletal-maturity-is ?letter ?snum ?confidence)
=>
        (retract ?maturity-frame)
        (bind ?ave-num (/ (+ ?snum ?lnum) 2))
```

```
      (assert (the maturity-is ?letter ?ave-num ?confidence))
      (fprintout prn crlf "The lean maturity is " ?letter "" ?lnum crlf)
      (fprintout prn "The skeletal maturity is " ?letter "" ?snum crlf)
      (fprintout prn "Based on skeletal and lean features the maturity
            appears to be " ?letter " " ?ave-num " !" crlf)
      (assert (quality-frame))
      )
```

```
;;;===========================================================================
;;; This rule is similar to -003 but is fired if skeletal and lean
;;; maturities are different.

(defrule bones-lean-show-different-maturity ""
      ?maturity-frame <- (maturity-frame)
      (skeletal-maturity-is ?letter ?snum ?confidence)
      (lean-maturity-is ?diff-letter&~:(eq ?diff-letter ?letter) ?lnum)
      (value-for maturity-is $?list)
=>
      (retract ?maturity-frame)
      (if (< (member ?diff-letter $?list) (member ?letter $?list))
            then (bind ?num (- (- 100 ?lnum) ?snum)))
      (if (> (member ?diff-letter $?list) (member ?letter $?list))
            then (bind ?num (+ (- 100 ?lnum) ?snum)))
      (if (> ?num 100)
            then (bind ?num 100))
      (if (< ?num 0)
            then (bind ?num 0))
      (assert (the maturity-is ?letter ?num ?confidence))
      (fprintout prn crlf "The lean maturity is " ?diff-letter "" ?lnum
            crlf)
      (fprintout prn "The skeletal maturity is " ?letter "" ?snum crlf)
      (fprintout prn "Based on skeletal and lean features the maturity
            appears to be " ?letter " " ?num " !" crlf)
      (assert (quality-frame))
      )
```

```
;;;===========================================================================
;;; If skeletal/lean maturity can be determined this rule will fire only
;;; when the specific conditions listed are true (as described on page 9
;;; of the standards) the degrees of maturity used in this rule should be
;;; checked with an expert.
;;; These rule state that if a skeletal maturity of low C is determined,
;;; but the lean maturity shows much younger, then the maturity may be
;;; slightly reduced so the carcass may qualify for a better grade.

(defrule special-case-for-c-maturity-001 ""
      (declare (salience 10))
      ?maturity-frame <- (maturity-frame)
      (skeletal-maturity-is C ?snum&:(< ?snum 25) ?confidence)
      (lean-maturity-is A ?anum)
=>
      (retract ?maturity-frame)
      (bind ?new-num (- ?anum 25))
      (assert (the maturity-is B ?new-num ?confidence))
      (fprintout prn "****************" crlf "Even though the skeletal
            features, or grader input, indicates a C- maturity " crlf
            "the characteristics of the lean indicate a younger carcass!"
```

```
           crlf
             "Therefore the maturity of this carcass is modified to B+ "
             ?new-num crlf)
         (assert (quality-frame))
         )

(defrule special-case-for-c-maturity-002 ""
         (declare (salience 10))
         ?maturity-frame <- (maturity-frame)
         (skeletal-maturity-is C ?snum&:(< ?snum 25) ?confidence)
         (lean-maturity-is B ?bnum&:(< ?bnum 30))
  =>
         (retract ?maturity-frame)
         (bind ?new-num (+ ?bnum 50))
         (assert (the maturity-is B ?new-num ?confidence))
         (fprintout prn crlf "Even though the skeletal features, or grader
               input, indicates a C- maturity " crlf
               "the characteristics of the lean indicate a younger carcass!"
               "Therefore the maturity of this carcass is modified to B "
               ?new-num crlf)
         (assert (quality-frame))
         )

;;;===========================================================
;;; determine maturity if all characteristics are the same letter age
;;;

;;;===========================================================
;;; This rule fires if only two bones are described and they indicate the
;;; same stage of maturity.

(defrule maturity-004 ""
         (maturity-frame)
         ?go <- (compare-the-ages)
         ?first <- (prelim-maturity gen1 ? ?letter ?num-1)
         ?second <- (prelim-maturity gen2 ? ?letter ?num-2)
         (not (prelim-maturity gen3 ? ? ?))
  =>
         (retract ?go ?first ?second)
         (bind ?ave-num (/ (+ ?num-1 ?num-2) 2))
         (assert (skeletal-maturity-is ?letter ?ave-num 50))
         )
;;;===========================================================
;;; this rule fires if three bones are described all indicating the
;;; same stage of maturity (defrule maturity-005 ""
         (maturity-frame)
         ?go <- (compare-the-ages)
         ?first <- (prelim-maturity gen1 ? ?letter ?num-1)
         ?second <- (prelim-maturity gen2 ? ?letter ?num-2)
         ?third <- (prelim-maturity gen3 ? ?letter ?num-3)
         (not (prelim-maturity gen4 ? ? ?))
  =>
         (retract ?go ?first ?second ?third)
         (bind ?ave-num (/ (+ ?num-1 ?num-2 ?num-3 ) 3))
         (assert (skeletal-maturity-is ?letter ?ave-num 75))
```

```
        )
;;;===========================================================================
;;; This rule fires if all four bones are described, and all indicate
;;; the same maturity.

(defrule maturity-006 ""
      (maturity-frame)
      ?go <- (compare-the-ages)
      ?first <- (prelim-maturity ? chine-bone-is ?letter ?num-1)
      ?second <- (prelim-maturity ? sacrum-is ?letter ?num-2)
      ?third <- (prelim-maturity ? lumbar-is ?letter ?num-3)
      ?fourth <- (prelim-maturity ? thoracic-is ?letter ?num-4)
  =>
      (retract ?go ?first ?second ?third ?fourth)
      (bind ?ave-num (/ (+ ?num-1 ?num-2 ?num-3 ?num-4) 4))
      (assert (skeletal-maturity-is ?letter ?ave-num 100))
      )

;;;===========================================================================
;;; These rules determine maturity if features indicate two different
;;; letter ages --> A+ and B- for example.

;;;===========================================================================
;;; this rule fires if only two bones are described
;;; and they indicate different maturities (defrule maturity-007 ""
      (maturity-frame)
      ?go <- (compare-the-ages)
      ?first <- (prelim-maturity gen1 ? ?letter-1 ?num-1)
      ?second <- (prelim-maturity gen2 ? ?letter-2&~:(eq ?letter-2
            ?letter-1) ?num-2)
      (not (prelim-maturity gen3 ? ? ?))
      (value-for maturity-is $?list)
  =>
      (retract ?go ?first ?second)
      (if (< (member ?letter-1 $?list) (member ?letter-2 $?list))
            then (bind ?num-2 (+ 100 ?num-2))
            else (bind ?num-1 (+ 100 ?num-1)))
      (bind ?ave-num (/ (+ ?num-1 ?num-2) 2))
      (if (> ?ave-num 100)
      then (if (< (member ?letter-1 $?list) (member ?letter-2 $?list))
            then (bind ?letter ?letter-2)
                  (bind ?ave-num (- ?ave-num 100))
            else (bind ?letter ?letter-1)))
      (assert (skeletal-maturity-is ?letter ?ave-num 50))
      )

;;;===========================================================================
;;; this rule is fired when three bones are described and they
;;; indicate two different maturities (defrule maturity-008 ""
      (maturity-frame)
      ?go <- (compare-the-ages)
      ?first <- (prelim-maturity ? ? ?letter-1 ?num-1)
      ?second <- (prelim-maturity ? ? ?letter-1 ?num-2)
```

```
        ?third <-(prelim-maturity ? ? ?letter-3&~:(eq ?letter-3 ?letter-1)
            ?num-3)
        (not (prelim-maturity gen4 ? ? ?))
        (value-for maturity-is $?list)
=>
        (retract ?go ?first ?second ?third)
        (if (< (member ?letter-1 $?list) (member ?letter-3 $?list))
            then (bind ?num-1 (+ 100 ?num-1))
                 (bind ?num-2 (+ 100 ?num-2))
            else (bind ?num-3 (+ 100 ?num-3)))
        (bind ?ave-num (/ (+ ?num-1 ?num-2 ?num-3) 3))
        (if (> ?ave-num 100)
        then (if (< (member ?letter-1 $?list) (member ?letter-3 $?list))
            then (bind ?letter ?letter-3)
                 (bind ?ave-num (- ?ave-num 100))
            else (bind ?letter ?letter-1)))
        (assert (skeletal-maturity-is ?letter ?ave-num 75))
        )

;;; ===========================================================================
;;; this rule is fired when four different bones are described and
;;; they indicate two different maturities (defrule maturity-009 ""
        (maturity-frame)
        ?first <- (prelim-maturity ? ? ?letter-1 ?num-1)
        ?second <- (prelim-maturity ? ? ?letter-1 ?num-2)
        ?third <- (prelim-maturity ? ? ?letter-2&~:(eq ?letter-2 ?letter-1)
            ?num-3)
        ?fourth <- (prelim-maturity ? ? ?letter-2 ?num-4)
        (value-for maturity-is $?list)
=>
        (retract ?first ?second ?third ?fourth)
        (if (< (member ?letter-1 $?list) (member ?letter-2 $?list))
            then (bind ?num-3 (+ 100 ?num-3))
                 (bind ?num-4 (+ 100 ?num-4))
            else (bind ?num-1 (+ 100 ?num-1))
                 (bind ?num-2 (+ 100 ?num-2)))
        (bind ?ave-num (/ (+ ?num-1 ?num-2 ?num-3 ?num-4) 4))
        (if (> ?ave-num 100)
        then (if (< (member ?letter-1 $?list) (member ?letter-2 $?list))
            then (bind ?letter ?letter-2)
                 (bind ?ave-num (- ?ave-num 100))
            else (bind ?letter ?letter-1)))
        (assert (skeletal-maturity-is ?letter ?ave-num 100))
        )

;;; ===========================================================================
;;; this rule is fired when four different bones are described and
;;; they indicate two different maturities, 3 of one and 1 of the
;;; other (defrule maturity-010 ""
        (maturity-frame)
        ?first <- (prelim-maturity ? ? ?letter-1 ?num-1)
        ?second <- (prelim-maturity ? ? ?letter-1 ?num-2)
```

```
        ?third <- (prelim-maturity ? ? ?letter-1 ?num-3)
        ?fourth <- (prelim-maturity ? ? ?letter-2&~:(eq ?letter-2
             ?letter-1) ?num-4)
        (value-for maturity-is $?list)
=>
        (retract ?first ?second ?third ?fourth)
        (if (< (member ?letter-1 $?list) (member ?letter-2 $?list))
              then (bind ?num-4 (+ 100 ?num-4))
              else (bind ?num-1 (+ 100 ?num-1))
                   (bind ?num-2 (+ 100 ?num-2))
                   (bind ?num-3 (+ 100 ?num-3)))
        (bind ?ave-num (/ (+ ?num-1 ?num-2 ?num-3 ?num-4) 4))
        (if (> ?ave-num 100)
        then (if (< (member ?letter-1 $?list) (member ?letter-2 $?list))
              then (bind ?letter ?letter-2)
                   (bind ?ave-num (- ?ave-num 100))
              else (bind ?letter ?letter-1)))
        (assert (skeletal-maturity-is ?letter ?ave-num 100))
        )

;;;===========================================================
;;;; rules for determining the lean maturity
;;;===========================================================

;;;===========================================================
;;;; These rules will fire only if lean color
;;;; or texture has been input by the grader,
;;;; this rule asserts knowledge about lean color & texture and maturity (defrule color-of-lean ""
        (the color-is ? ?)
=>
        (assert (maturity-frame))
        (assert
             (leanmat color-is bleached-red A 25)
             (leanmat color-is light-red A 25)
             (leanmat color-is mod-light-red A 50)
             (leanmat color-is cherry-red A 75)
             (leanmat color-is slightly-dark-red A 100)
             (leanmat color-is mod-dark-red B 100)
             (leanmat color-is dark-red C 100)
             (leanmat color-is very-dark-red D 100) )
        )

(defrule texture-of-lean ""
        (the texture-is ? ?)
=>
        (assert (maturity-frame))
        (assert
             (leanmat texture-is very-fine A 50)
             (leanmat texture-is fine A 100)
             (leanmat texture-is mod-fine B 100)
             (leanmat texture-is slightly-coarse C 100)
             (leanmat texture-is coarse D 100)
             (leanmat texture-is very-coarse E 100))
        )
;;;===========================================================
```

```
;;; this rule will match input to the fact list from the previous rule
;;; and place the data in the proper format for processing (defrule determine-lean-mat-facts ""
      (maturity-frame)
      (or  ?remove <- (the ?parameter&:(eq ?parameter color-is) ?value ?)
           ?remove <- (the ?parameter&:(eq ?parameter texture-is) ?value
           ?))
      (leanmat ?parameter ?value ?letter ?num)
  =>
      (retract ?remove)
      (assert (lean ?parameter ?value ?letter ?num))
      (fprintout t "the " ?parameter " " ?value " indicates a lean
           maturity of " ?letter " " ?num crlf)
      )

;;;===========================================================
;;; this rule will fire if color and texture are input and they
;;; indicate the same level of maturity (defrule lean-maturity-001 ""
      (maturity-frame)
      ?first <- (lean color-is ? ?letter ?num-1)
      ?second <- (lean texture-is ? ?letter ?num-2)
  =>
      (retract ?first ?second)
      (bind ?ave-num (/ (+ ?num-1 ?num-2) 2))
      (fprintout prn "The characteristics of the lean indicate " ?letter
           ?ave-num " maturity!" crlf)
      (assert (lean-maturity-is ?letter ?ave-num))
      )
;;;===========================================================
;;; this rule will fire if both color and texture are input and
;;; they indicate two different levels of maturity (defrule lean-maturity-002 ""
      (maturity-frame)
      ?first <- (lean color-is ? ?letter-1 ?num-1)
      ?second <- (lean texture-is ? ?letter-2&~:(eq ?letter-1 ?letter-2)
           ?num-2)
      (value-for maturity-is $?list)
  =>
      (retract ?first ?second)
      (if (< (member ?letter-1 $?list) (member ?letter-2 $?list))
           then (bind ?num-2 (+ ?num-2 100))
           else (bind ?num-1 (+ ?num-2 100)))
      (bind ?ave-num (/ (+ ?num-1 ?num-2) 2))
      (if (> ?ave-num 100)
       then (if (< (member ?letter-1 $?list) (member ?letter-2 $?list))
           then (bind ?letter ?letter-2)
                (bind ?ave-num (- ?ave-num 100))
           else (bind ?letter ?letter-1)))
      (fprintout prn "The characteristics of the lean indicate " ?letter
      ?ave-num " maturity!" crlf)
      (assert (lean-maturity-is ?letter ?ave-num))
      )
;;;===========================================================
```

```
;;;. this rule will fire if only one lean characteristic is given,
;;; either color or texture (defrule lean-maturity-003 ""
      (maturity-frame)
      ?first <- (lean ?parameter ?value ?letter ?num)
      (not (lean ?parm&~:(eq ?parm ?parameter) ? ? ?))
      (the finished-is yes)
=>
      (retract ?first)
      (fprintout prn "The " ?parameter " " ?value " indicates " ?letter
           ?num " maturity!" crlf)
      (assert (lean-maturity-is ?letter ?num))
      )

;;;===========================================================
;;; rules for determining yield grade
;;;===========================================================

;;; ===========================================================
;;; This rule is the direct method of computing the yield grade,
;;; it fires if all four parameters are input or if default values
;;; are used for kph fat or rib eye area or both.

(defrule yield-grade ""
      ?yield-frame <- (yield-frame)
      (input back-fat-is ?inches)
      (input carcass-weight-is ?pounds)
      (input rib-eye-area-is ?sq-inches)
      (input kph-fat-is ?percent)
      (input adjustment ?adjust-by)
=>
      (retract ?yield-frame)
      (bind ?prelim-yield-grade (- (+ 2.5 (* 2.5 ?inches) (* .20
           ?percent)
           (* .0038 ?pounds)) (* .32 ?sq-inches)))
      (bind ?yield-grade (+ ?prelim-yield-grade ?adjust-by))
      (format prn "The yield grade is %2.2f" ?yield-grade)
      (fprintout prn " " crlf)
      (format t "The yield grade is %2.2f" ?yield-grade)
      (format data-file "The yield grade is %2.2f" ?yield-grade)
      (assert (yield-grade-is ?yield-grade))
      (assert (check-limits))
      )

;;;===========================================================
;;; This rule checks to make sure yield grade will not be six or above,
;;; if it is, then it is reduced to 5.99.

(defrule check-upper-limits ""
      ?in-bounds <- (check-limits)
      ?high-grade <- (yield-grade-is ?grade&:(>= ?grade 6))
=>
      (retract ?in-bounds ?high-grade)
      (assert (yield-grade-is 5.99))
      (fprintout prn "The yield grade is adjusted to 5.99+" crlf)
      (fprintout t "The yield grade is adjusted to 5.99+ " crlf)
```

```
        (fprintout data-file "The yield grade is adjusted to 5.99+" crlf)
        )

;;;===========================================================================
;;; This rule is similar to the last rule, only it checks the lower limit
;;; and sets the yield grade to 1.00 if it is below that.

(defrule check-lower-limits ""
        ?in-bounds <- (check-limits)
        ?low-grade <- (yield-grade-is ?grade&:(< ?grade 1))
 =>
        (retract ?in-bounds ?low-grade)
        (assert (yield-grade-is 1.00))
        (fprintout prn "The yield grade is adjusted to 1.00 " crlf)
        (fprintout t "The yield grade is adjusted to 1.00 " crlf)
        (fprintout data-file "The yield grade is adjusted to 1.00 " crlf)
        )

;;;===========================================================================
;;; Indirect method using back fat as preliminary yield grade,
;;; and adjustments are made for kph fat or rib eye area.
;;; At least one adjustment must be made, even if it is zero (0)

(defrule preliminary-yield-grade ""
        ?remove <- (input yield-grade-is ?pre-yield)
        ?adj-yield <- (input adjustment ?change)
 =>
        (retract ?adj-yield ?remove)
        (bind ?yield-grade (+ ?pre-yield ?change))
        (format prn "The adjusted yield grade is %2.2f" ?yield-grade)
        (fprintout prn " " crlf)
        (format data-file "The adjusted yield grade is %2.2f" ?yield-grade)
        (assert (yield-grade-is ?yield-grade))
        (printout t "the yield grade is " ?yield-grade crlf)
        )

;;;===========================================================================
;;; This rule will compute the preliminary yield grade based on back fat
;;; thickness alone. This is the standard method used by most experienced
;;; meat graders.  This method takes back fat in inches and computes the
;;; preliminary yield instead of the grader estimating it.

(defrule preliminary-yield-grade-002 ""
        ?yield-frame <- (yield-frame)
        (input back-fat-is ?inches)
        (input adjustment ?adjust-by)
        (not (input yield-grade-is ?))
        (not (input carcass-weight-is ?))
 =>
        (retract ?yield-frame)
        (bind ?result ( + 2.0001 ( * 2.5 ?inches)))
        (assert (input yield-grade-is ?result))
        )

;;;===========================================================================
;;; This rule asserts an adjustment of zero if the grader did not input
;;; one, this is necessary to maintain consistency for the above rule.
```

```
(defrule adjust-the-yield-grade
      (the finished-is yes)
      (not (input adjustment ?))
=>
      (assert (input adjustment 0))
      )

;;;==============================================================
;;; This rule fires to determine the default rib-eye-area
;;; if it is not input by the grader and the indirect method is not used.
;;; The area is computed using the body weight, and is used in the
;;; computation for determing yield grade.

(defrule compute-rib-eye ""
      (yield-frame)
      (the finished-is yes)
      (input carcass-weight-is ?pounds)
      (not (input rib-eye-area-is ?))
=>
      (bind ?sq-inches (+ 3.8 (* 1.2 (/ ?pounds 100))))
      (assert (input rib-eye-area-is ?sq-inches))
      (format prn "The default rib eye area is %2.2f " ?sq-inches)
      (fprintout prn crlf "This is based only on carcass weight. " crlf)
      (format data-file "The default rib eye area is %2.2f" ?sq-inches)
      )

;;;==============================================================
;;; This rule fires to determine the default kph fat if not input by the
;;; grader and the indirect method is not used, the default value is 3.5

(defrule default-kph-fat ""
      (yield-frame)
      (the finished-is yes)
      (input carcass-weight-is ?)
      (not (input kph-fat-is ?))
=>
      (bind ?percent 3.5)
      (assert (input kph-fat-is ?percent))
      (fprintout prn "The default percent of KPH fat is set at 3.5%."
            crlf)
      (fprintout data-file "The default percent of KPH fat is set at
            3.5%" crlf)
      )

;;;==============================================================
;;;
;;;       ***************   END OF PROGRAM FILE   *******************  ;;;
;;;==============================================================
```

We claim:

1. System for grading carcasses comprising:
   a. means for establishing an identification for each carcass to be graded;
   b. input means for inputting information relating to the characteristics of said carcass to be graded and automatically correlating said information to said identification;
   c. a program comprising a knowledge base of facts and rules relating to the grading of carcasses;
   d. an inference engine for comparing said information against the facts and rules of said knowledge base; and
   e. means for outputting the results of said grading as related to said carcass.

2. The system of claim 1 wherein said input means is a voice recognition system.

3. The system of claim 2 wherein said voice recognition system includes a library of preprogrammed terms and expressions relating to facts of carcass values and carcass characteristics useful in determining the yield and quality grades of carcasses.

4. The system of claim 1 wherein said inference engine is data-driven and uses forward-chaining logic.

5. A method for grading carcasses with the assist of a knowledge-based system, the method comprising:
   a. providing a program comprising a knowledge base of facts and rules relating to the grading of carcasses and an inference engine for comparing inputted information against the facts and rules of said knowledge base;
   b. establishing an identification for each carcass to be graded;
   c. inputting into the knowledge-based system information relating to the characteristics of said carcass to be graded and automatically correlating said information to the identification for that carcass;
   c. providing means for evoking said inference engine to compare said inputted information against the facts and rules of said knowledge base and for generating values representative of the grade of said carcass;
   d. providing a means for outputting the values representative of the grade of the carcass.

6. The method as described in claim 5 wherein said information is inputted vocally through a voice recognition system.

7. The method as described in claim 5 wherein said inputted information is allocated to a unique file for each carcass, and the input of a first predetermined unit of information initiates the creation of said file.

8. The method as described in claim 5 wherein sufficient information is inputted to allow said inference engine to generate values relating to both yield grade and quality grade.

9. The method as described in claim 5 wherein said carcasses are beef carcasses.

* * * * *